(12) United States Patent
Cook et al.

(10) Patent No.: US 8,788,835 B2
(45) Date of Patent: Jul. 22, 2014

(54) METHODS FOR SELECTIVELY CAPTURING AND REPLICATING ONE-TIME PASSWORD GENERATOR FUNCTIONALITY FROM DEVICE TO DEVICE

(75) Inventors: Debra L Cook, Tinton Falls, NJ (US);
Vijay K Gurbani, Lisle, IL (US);
Thomas B Reddington, Mountain Lakes, NJ (US)

(73) Assignee: Alcatel Lucent, Boulogne Billancourt (FR)

( * ) Notice: Subject to any disclaimer, the term of this patent is extended or adjusted under 35 U.S.C. 154(b) by 1605 days.

(21) Appl. No.: 11/895,938

(22) Filed: Aug. 28, 2007

(65) Prior Publication Data
US 2009/0064294 A1    Mar. 5, 2009

(51) Int. Cl.
*H04L 29/06*    (2006.01)

(52) U.S. Cl.
USPC .......................................................... 713/184

(58) Field of Classification Search
USPC .................................. 726/9, 20; 713/184, 185
See application file for complete search history.

(56) References Cited

U.S. PATENT DOCUMENTS

| | | | |
|---|---|---|---|
| 2006/0288405 A1* | 12/2006 | Albisu et al. | 726/8 |
| 2007/0011724 A1* | 1/2007 | Gonzalez et al. | 726/4 |
| 2007/0133591 A1* | 6/2007 | Shatford | 370/457 |

\* cited by examiner

*Primary Examiner* — Edward Zee
(74) *Attorney, Agent, or Firm* — Hitt Gaines, PC

(57) ABSTRACT

Structures and methods are disclosed for selectively capturing ("peeling") and replicating ("cloning") OTP tokens from one device to another while maintaining OTP state. Embodiments described herein provide for sending, from a first device to a second device, state information including for example, a key, a current OTP sequence value and a time to expiry value corresponding to selected tokens to be cloned. The second device thereafter uses the state information to generate OTP sequences corresponding to the selected tokens in time-synchronization with corresponding authentication entities. Additionally, embodiments described herein provide for restoring the OTP sequence corresponding to the selected tokens on the first device following a loss of synchronization of the selected tokens on the first device.

9 Claims, 5 Drawing Sheets

PRIOR ART

INTERNAL TO MOBILE TELEPHONE

100

INFORMATION DISPLAYED ON MOBILE TELEPHONE

METHODS FOR SELECTIVELY CAPTURING AND REPLICATING ONE-TIME PASSWORD GENERATOR FUNCTIONALITY FROM DEVICE TO DEVICE

CROSS-REFERENCE TO RELATED APPLICATIONS

This invention is related to U.S. patent application Ser. No. 11/732,199, titled "Method and Apparatus for Generating One-Time Passwords," filed Apr. 3, 2007, assigned to the assignee of the present application and incorporated herein by reference.

FIELD OF THE INVENTION

This invention relates generally to the art of authentication using tokens that generate one-time password (OTP) sequences and, more particularly, to methods that enable OTP tokens to be selectively captured and replicated (i.e., "cloned") from one device to another while maintaining OTP state.

BACKGROUND OF THE INVENTION

One-time password generators (e.g., tokens) are devices or software that generate a series of pseudorandom sequences ("passwords") used, for example and without limitation, for user authentication and access to computer accounts associated with banking transactions, brokerage accounts and the like. Most typically, the OTP sequences are recalculated frequently (e.g., every 60 seconds), such that any given password is likely to be valid for only a single transaction (hence, they are known as "one-time" passwords), after which the token recalculates a new password based on the previous password. Typically, when a user desires to access a particular account, the user enters a personal identification number (PIN) concatenated with a currently displayed OTP sequence via a user interface. An authentication entity (e.g., server) calculates OTP sequences using the same mathematical algorithm as the token, thus producing a series of OTP sequences in time-synchronization with the token. The authentication entity also correlates the OTP sequences with the users PIN and can therefore authenticate a valid user if the OTP sequence entered by the user associated with a particular PIN matches the corresponding OTP sequence generated by the authentication entity. The use of tokens for generating one-time passwords is considered more secure than alternative mechanisms for accessing accounts (for example, using static passwords, personal identification numbers (PINS) and/or automated teller machine (ATM) cards).

While OTP tokens offer important security benefits, they raise some problems relating to implementation and human factors issues. One problem is that many OTP implementations require a separate physical token per account which is unappealing to many customers and businesses. A related problem is that OTP tokens must be replaced periodically as they age and their battery life dies. Related patent application Ser. No. 11/732,199 is directed to addressing these problems by describing a manner of providing multiple OTP generators on a single rechargeable device (e.g., a cell phone), thus obviating the need for a user to carry multiple physical tokens and the need to replace tokens due to aging batteries.

However, to further enhance this approach, a need exists for a mechanism for selectively capturing (or "peeling off") one or more tokens from among the multiple OTP generators of a primary device and replicating (or "cloning") the selected OTP tokens to another device while maintaining OTP state and functionality. These features are needed for reasons including, without limitation, to guard against actual or prospective loss of synchronization ("loss of synch") of a token maintained by the primary device (which may occur upon shut-off or battery consumption of the primary device), to create additional copies in case the primary device is lost or stolen, or to allow a user to loan or share an OTP token from the primary device without relinquishing possession of the primary device. Still further, when offloading OTP functionality from a primary device to another device, a need exists to provide a mechanism for transferring OTP functionality back to the primary device or replacement device, for example, to resurrect OTP functionality following loss of sync of a primary device. The present invention is directed to addressing these needs.

SUMMARY OF THE INVENTION

The present invention provides structures and methods for selectively capturing ("peeling") and replicating ("cloning") OTP tokens from one device to another while maintaining OTP state.

In one embodiment, there is provided a method, carried out by a first communication device that maintains one or more one-time password (OTP) tokens for authenticating access to a corresponding one or more accounts of a user, for selectively capturing and cloning selected tokens from the first communication device to a second communication device. The method comprises selecting, responsive to user input, one or more of the OTP tokens resident on the first device, yielding one or more selected tokens to be cloned. For each selected token, the first device sends state information to the second device that will enable the second device to generate OTP sequences corresponding to the selected token in time-synchronization with a corresponding authentication entity.

In another embodiment, there is provided a method exercisable in a communication system that includes at least a first communication device that maintains multiple one-time password (OTP) tokens for authenticating access to corresponding multiple accounts of a user. The method comprises selecting, responsive to user input, a subset of the multiple OTP tokens resident on the first device, yielding one or more selected tokens to be cloned and sending state information associated with the selected tokens from the first communication device to a second communication device. The second communication device thereafter uses the state information to generate OTP sequences corresponding to the selected tokens in proper time-synchronization with one or more corresponding authentication entities.

In yet another embodiment, there is provided a method, carried out by the second communication device in a communication system that includes a first and second communication device wherein the first communication device maintains one or more one-time password (OTP) tokens for authenticating access to corresponding multiple accounts of a user. The method comprises receiving, from the first communication device, a request to clone at least one selected token of the one or more OTP tokens maintained by the first communication device. Coincident to the request, the second communication device receives state information associated with the at least one selected token. The second communication device then uses the state information to generate OTP sequences corresponding to the at least one selected token in time-synchronization with a corresponding at least one authentication entity.

In still another embodiment, there is provided a method for offloading state information from a first device to a second device. The method comprises maintaining one or more one-time password (OTP) tokens resident on a first device for authenticating access to a corresponding one or more accounts of a user, the OTP tokens subject to loss of synchronization with a corresponding authentication entity. The first device sends state information corresponding to at least one selected token from the first device to a second device. Following a loss of synchronization of the selected token resident on the first device, the first device obtains information from the second device that enables the first device to regenerate OTP sequences corresponding to the selected token in proper synchronization with the corresponding authentication entity.

BRIEF DESCRIPTION OF THE DRAWINGS

The foregoing and other advantages of the invention will become apparent upon reading the following detailed description and upon reference to the drawings in which.

DESCRIPTION OF THE PREFERRED EMBODIMENT(S)

Figure 1:
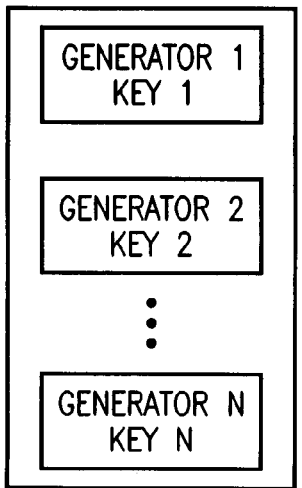
FIG. 1 is an illustrative view of a communication device having multiple OTP tokens in accordance with the prior art.
Figure 1:
Figure 1:
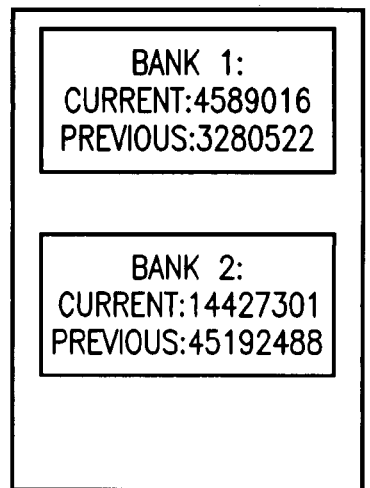
Figure 1:
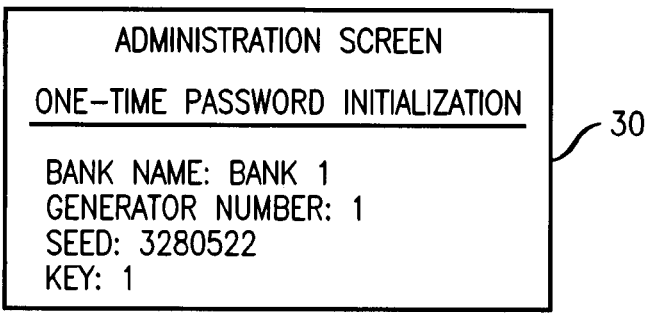

FIG. 1 shows an illustrative view of a communication device 100 (as shown, a mobile telephone) arranged in accordance with related U.S. patent application Ser. No. 11/732,199 to include multiple OTP generators (tokens) on a single device. The communication device has an internal area 10 containing multiple instances of OTP sequence generators (Generator 1, Generator 2 . . . Generator N) for producing multiple corresponding instances of OTP tokens (key 1, key 2 . . . key N). The sequence generators may be implemented, for example and without limitation, in software residing within the internal area 10 of the communication device 100. Generally, the multiple instances of sequence generators may correspond to multiple accounts of a user. For example, the user may assign separate instances of the sequence generator to separate service entities, e.g., banks, brokerage firms, etc.

The multiple instances of the sequence generators may be based, for example and without limitation, on a standard algorithm such as the Advanced Encryption Standard (AES). Each sequence generator encrypts a seed, i.e., an initial string of digits, with AES using a 16 byte key supplied by the user to the sequence generator to produce a separate pseudorandom sequence of alphabetical, numeric or alpha-numeric values of 6-8 characters. Also, each sequence generator computes the next value, i.e., a different pseudorandom sequence, after a predetermined interval, e.g., 60 seconds. Illustratively, one method to compute the next value is to have AES repeatedly encrypt the output of a previous encryption step, starting with the seed. This resulting ciphertext is then converted into a 6-8 character value for display to the user.

In the illustrative example of FIG. 1, the output of the sequence generators (as shown, a current and previous OTP sequence and account identifier corresponding to two active accounts "Bank 1" and "Bank 2") is displayed via display 20. Further, an administrative screen 30 is provided for use in initializing and synchronizing the OTP passwords with the various service entities associated with the accounts. As shown, the administrative screen 30 indicates that Generator 1 has been assigned to Bank 1. Generator 2, shown in internal area 20, corresponds to Bank 2. Generator N has not been assigned.

As will be appreciated, the concept of providing multiple tokens on a single device (e.g., mobile telephone) such as described in FIG. 1 is advantageous in that it obviates the need for the user to carry multiple physical tokens for multiple accounts; and also, since the mobile telephone is rechargeable, it obviates the need for the user to obtain replacement tokens from time to time as individual tokens age and/or their battery expires. Nevertheless, applicants have identified opportunities to further improve upon the concept.

First, in instances where the rechargeable device (e.g., communication device 100) is turned off or shuts off due to a weak or dead battery for a period of time, it is contemplated that the tokens resident on the device will not be generated (unless some residual power supply is maintained on the device to preserve token generator functionality). In such case, even when power is turned back on or the device is recharged so as to resume its token generation functionality, a loss of synchronization will result with the OTP sequences maintained by the authentication servers associated with the user accounts, thereby rendering the accounts inaccessible to the user. According to principles of the present invention, there is provided a means for replicating (or "cloning") OTP generators from one device to another while maintaining OTP state and functionality. In such manner, for example, OTP generators may be replicated from a primary device (e.g., communication device 100) to a secondary device or to multiple devices to guard against actual or prospective loss of synch of a token maintained by the primary device and/or to create additional copies in case the primary device is lost or stolen.

A second, related opportunity addressed by the present invention lies in the desire for flexibility to selectively capture or "peel" a subset of one or more OTP generators from a primary device (e.g., communication device 100), so as to clone a selected one or more OTP generators from the primary device to a secondary device. This feature is contemplated, for example, to allow a user to loan or share an OTP token from the primary device to a secondary device or multiple devices without relinquishing possession of the primary device and without giving the other users access to all of the tokens residing on the primary device.

Figure 2:
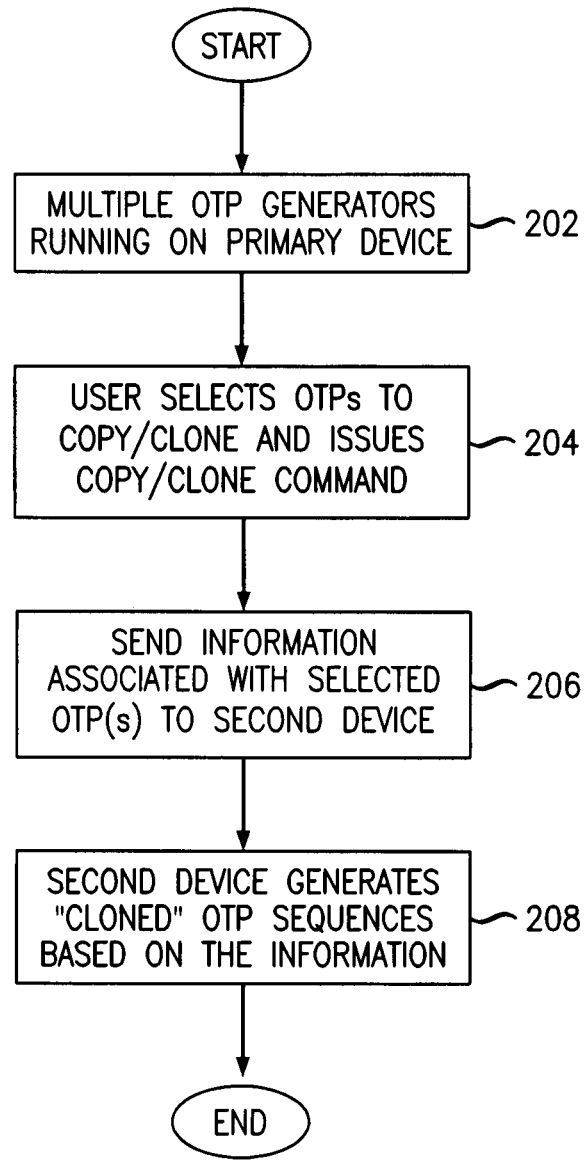
FIG. 2 is a flowchart showing steps for peeling and cloning OTP tokens from a primary device to a second device according to principles of the present invention.

FIG. 2 is a flowchart of exemplary steps for peeling and cloning OTP tokens from a primary device to a second device according to principles of the present invention. The steps of FIG. 2 may be implemented by communication devices including, without limitation, mobile telephones, MP3 players, laptops or personal computers or network devices.

At step 202, a primary device (e.g., communication device 100) contains multiple OTP tokens (e.g., OTP 1, OTP 2, OTP 3, OTP 4, OTP 5, OTP 6) resident on the same device. The multiple tokens correspond to multiple user accounts for which corresponding OTP sequences are maintained, in time-synchronization, by respective service entities (e.g., banks, brokerage firms) associated with the user accounts. In one embodiment, each token comprises a pseudorandom sequence of 6-8 characters generated according to the Advanced Encryption Standard (AES) using a 16-byte key, initially based on a seed sequence and thereafter (e.g., every 60 seconds) based on the immediate previous sequence.

At step 204, a user of the primary device selects one or more OTPs to clone from among the multiple OTPs resident on the primary device and issues a copy command (or "clone" command) to the primary device. As will be appreciated, the manner of selecting OTPs and issuing a copy/clone command may be implemented via virtually any type of user interface, known or unknown, that is operated on the primary device. For example and without limitation, the user may select OTPs for cloning by issuing voice commands, entering text, numbers and/or codes (e.g., star-codes), selecting displayed text/icons or the like.

At step 206, for each OTP selected in step 204, the primary device sends information associated with the selected OTP to a device that will receive and "clone" the selected OTP. In one embodiment, the information comprises the OTP key (i.e., the 16-byte key that is used to generate the consecutive OTP sequences), the OTP current value (i.e., the current OTP sequence displayed by the primary device) and a time to expiry value (i.e., the time remaining until the current value expires and the next consecutive value is to be computed).

At step 208, the second device receives the information provided by the primary device and operates, based on the information provided, to generate subsequent OTP sequences at predetermined intervals (e.g., every 60 seconds) having the same value and in time-synchronization with the primary device. In such manner, selected OTP tokens are copied or "cloned" to a second device to guard against actual or prospective loss of synch of a token maintained by the primary device and/or to create additional copies in case the primary device is lost or stolen. As will be appreciated, various alternative implementations are possible whereby the second device is able to clone the selected keys with fewer or greater items of information than described in step 206, for example, if the second device is already in possession or can independently determine some of the information needed to clone the second OTP.

Figure 3A:
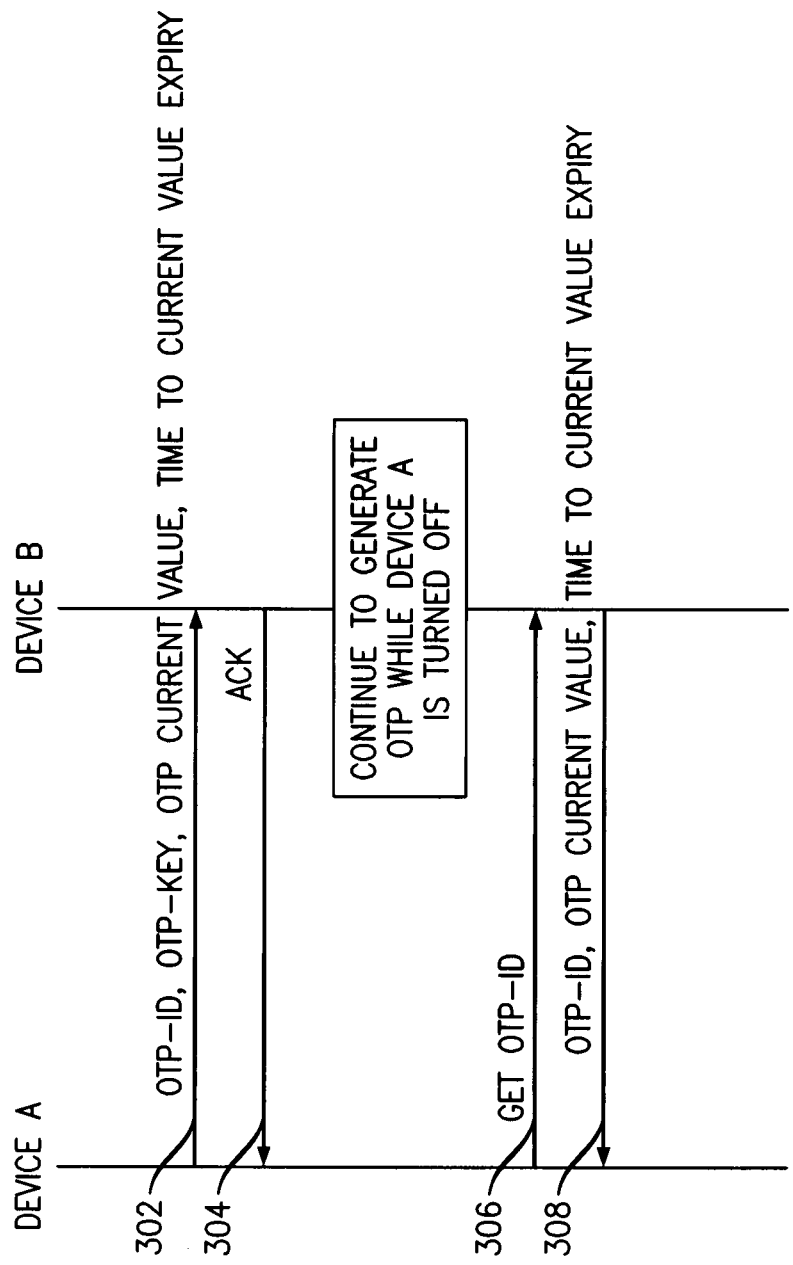
FIG. 3A is a message sequence chart illustrating a first exemplary embodiment of offloading and later resurrecting OTP functionality by exchanging OTP tokens between a first and second device.

FIG. 3A is a message sequence chart illustrating a first exemplary embodiment of offloading and later resurrecting OTP functionality by exchanging OTP tokens between a first device ("device A") and second device ("device B") according to principles of the present invention. The steps of FIG. 3A may be implemented by communication devices including, without limitation, mobile telephones, MP3 players, laptops or personal computers or network devices.

For example and without limitation, device A may comprise a rechargeable device (e.g., a cell phone) that is subject to shut-off or loss of power, and thereby the OTP tokens residing on the primary device are subject to actual or prospective loss of synch with the corresponding OTP sequences maintained by the service entities; and device B may comprise a "backup" device (e.g., a network device) that is less subject to loss of power than device A and to which the device A OTP sequence is to be cloned to guard against actual or prospective loss of synch of a token maintained by device A.

The message sequence begins with device A sending a copy command 302 (or "clone" command) to device B to initiate cloning of a selected token. In one embodiment, coincident to sending the copy/clone command, device A sends state information that allows device B to generate OTP sequences associated with the selected token having the same value and in time-synchronization with device A. For example and without limitation, the state information may include: an OTP identifier (e.g., OTP 2), the associated OTP key (i.e., the 16-byte key that is used to generate the consecutive OTP sequences), the OTP current value (i.e., the current OTP sequence displayed by device A) and a time to expiry value (i.e., the time remaining until the current value expires and the next consecutive value is to be computed).

Device B responds with an acknowledgement (ACK) message 304 indicating successful receipt of the copy command and associated state information. In the embodiment of FIG. 3A, device B thereafter operates to generate subsequent OTP sequences at predetermined intervals (e.g., every 60 seconds) having the same value and in time-synchronization with device A. At this point, the selected OTP tokens are copied or "cloned" from device A to device B and device A may be actively turned off for a period of time, for example, to conserve battery power, thereby causing device A (at least temporarily) to lose synch with the OTP token that was copied to device B.

Some time later, when the device A is turned back on or restores power, device A issues a command 306 to device B with indicia of the cloned OTP sequence (i.e., OTP ID), so as to request restoration of the OTP sequence to device A. Device B, having maintained the OTP sequence while device A was turned off, sends a reply 308 including the state information that will enable device A to compute and resume the OTP sequence in time-synchronization with device B: an OTP identifier (e.g., OTP 2), the associated OTP key (i.e., the 16-byte key that is used to generate the consecutive OTP sequences), the OTP current value (i.e., the current OTP sequence displayed by device A) and a time to expiry value (i.e., the time remaining until the current value expires and the next consecutive value is to be computed). Device A uses this information to recapture the cloned OTP token and generate subsequent OTP sequences at predetermined intervals (e.g., every 60 seconds) having the same value and in time-synchronization with device B.

Figure 3B:
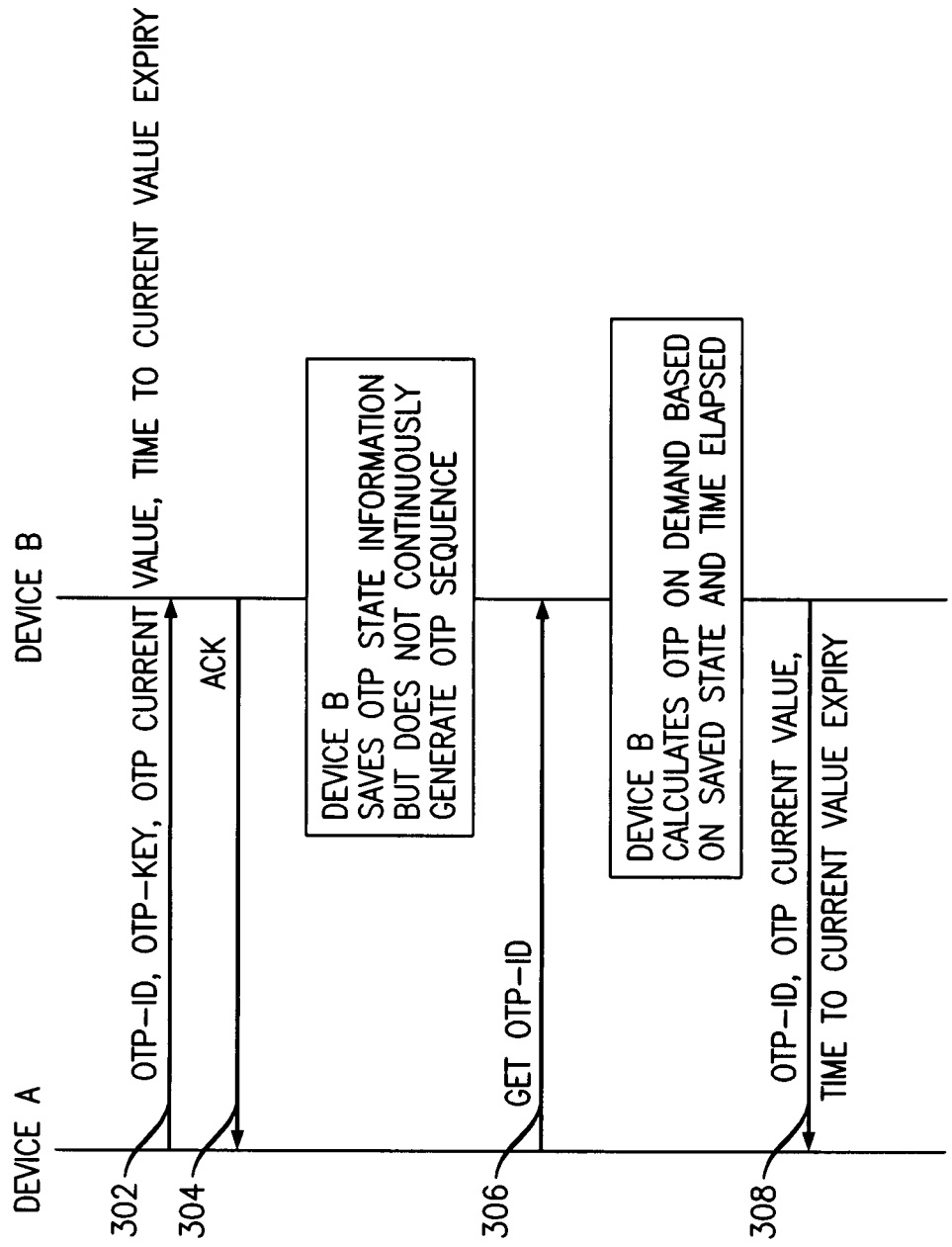
FIG. 3B is a message sequence chart illustrating a second exemplary embodiment of offloading and later resurrecting OTP functionality by exchanging OTP tokens between a first and second device.

FIG. 3B is a message sequence chart illustrating a second exemplary embodiment of offloading and later resurrecting OTP functionality by exchanging OTP tokens between a first device ("device A") and second device ("device B") according to principles of the present invention. The steps of FIG. 3B may be implemented by communication devices including, without limitation, mobile telephones, MP3 players, laptops or personal computers or network devices.

The message sequence of FIG. 3B begins in the same manner as described in relation to FIG. 3A with device A sending a copy command 302 (or "clone" command) to device B to initiate cloning of a selected token. Coincident to sending the copy/clone command, device A sends state information that allows device B to generate OTP sequences associated with the selected token having the same value and in time-synchronization with device A. For example and without limitation, device A may send state information including an OTP identifier, the associated OTP key, the OTP current value and a time to expiry value as heretofore described.

Device B responds with an acknowledgement (ACK) message 304 indicating successful receipt of the copy command and associated state information. At this point, device A may be actively turned off for a period of time, for example, to conserve battery power, thereby causing device A (at least temporarily) to lose synch with the OTP token for which state information was sent to device B.

In the embodiment of FIG. 3B, responsive to receiving the state information, device B does not continuously operate to generate subsequent OTP sequences but rather saves the state information and records the time elapsed since receiving the state information. Alternatively or additionally, device B may record the number of time intervals elapsed since receiving the state information. In such manner, device B does not immediately "clone" the token but possesses the information necessary to clone the token some time later, e.g., upon demand from device A. This embodiment may be utilized, for example, in instances where device B is a power-sensitive device (e.g., cell phone). By computing the sequence on demand rather than continuously, the drain on battery power of device B can be minimized.

Some time later, when the device A is turned back on or restores power, device A issues a command 306 to device B with indicia of the cloned OTP sequence (i.e., OTP ID), so as to request restoration of the OTP sequence to device A. Device B, based on the previously saved state information and the time elapsed (or number of time intervals elapsed), restarts the generator and ultimately calculates the OTP current value and subsequent values in proper time-synchronization with the original sequence. In one embodiment, device B "catches up" to the current value by rapidly computing all values that occurred within the time interval until reaching the current password; then upon reaching the current value, device B resumes computing the next consecutive value every 60 seconds.

Having computed and resumed the sequence in proper time-synchronization with the original sequence upon demand from device A, device B sends a reply 308 including state information that will enable device A to also compute and resume the OTP sequence in proper time-synchronization: an OTP identifier, the associated OTP key, the OTP current value and a time to expiry value. Device A uses this information to recapture the cloned OTP token and generate subsequent OTP sequences at predetermined intervals (e.g., every 60 seconds) having the same value and in time-synchronization with device B.

Figure 3C:
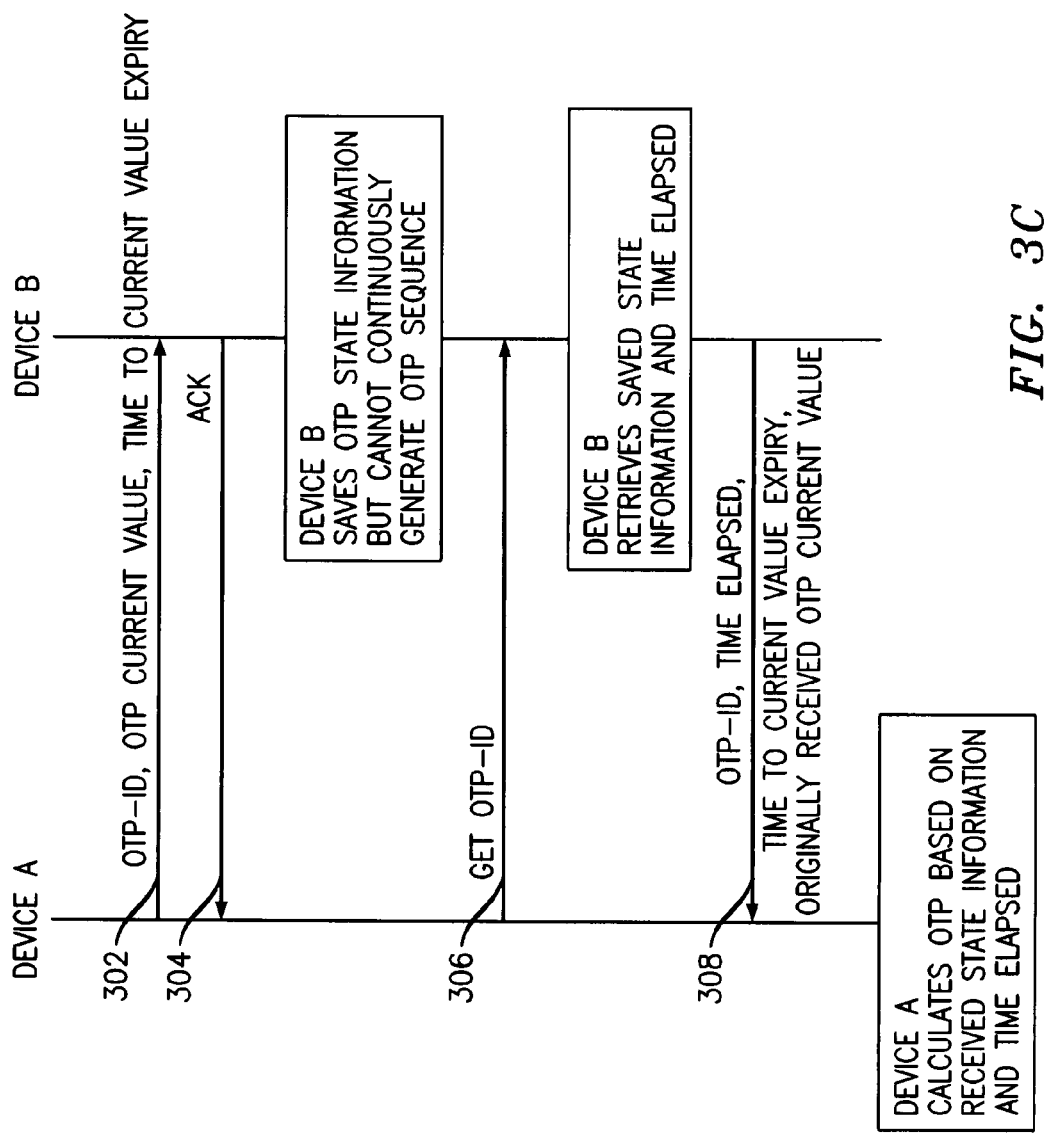
FIG. 3C is a message sequence chart illustrating a third exemplary embodiment of offloading and later resurrecting OTP functionality by exchanging OTP tokens between a first and second device.

FIG. 3C is a message sequence chart illustrating a third exemplary embodiment that provides for a first device ("device A") offloading OTP state information to a second device ("device B") and later resurrecting OTP functionality at the first device. The steps of FIG. 3C may be implemented by communication devices including, without limitation, mobile telephones, MP3 players, laptops or personal computers or network devices.

The message sequence of FIG. 3C begins with device A sending a message 302 to device B to initiate saving of OTP state information associated with a particular OTP token. Coincident to sending the message 302, device A sends to device B the OTP state information that is to be saved. In one embodiment, the state information does not include an OTP key associated with the selected token. For example and without limitation, device A may send state information including an OTP identifier, the OTP current value and a time to expiry value as heretofore described but not the OTP key. Because device B is not provided the OTP key, device B does not possess sufficient information to "clone" the token such as described in FIG. 3A and FIG. 3B, but nevertheless can save the state information and assist device A in later resurrecting OTP functionality as will hereinafter be described.

Device B responds with an acknowledgement (ACK) message 304 indicating successful receipt of the state information. At this point, device A may be actively turned off for a period of time, for example, to conserve battery power, thereby causing device A (at least temporarily) to lose synch with the OTP token for which state information was sent to device B.

In the embodiment of FIG. 3C, responsive to receiving the state information, device B saves the state information and records the time elapsed since receiving the state information. Alternatively or additionally, device B may record the number of time intervals elapsed since receiving the state information. As heretofore noted, device B is unable to "clone" the token (i.e., to generate OTP sequences) but saves the state information and elapsed time information so as to assist device A in resurrecting OTP functionality some time later, e.g., upon demand from device A. This embodiment may be utilized, for example, in instances where device B is a network device that is not trusted to maintain security of the OTP key and associated OTP functionality.

Some time later, when the device A is turned back on or restores power, device A issues a command 306 to device B with indicia of the cloned OTP sequence (i.e., OTP ID), so as to request restoration of the OTP sequence to device A. Device B retrieves the previously saved state information and the time elapsed (or number of time intervals elapsed) and sends a reply 308 to device A including information that will enable device A to resurrect the OTP sequence in proper time-synchronization. For example and without limitation, this information may include an OTP identifier, the elapsed time (or number of time intervals elapsed), the originally received OTP value and a time to expiry value.

Device A, based on the information received from device B, restarts the generator and ultimately calculates the OTP current value and subsequent values in proper time-synchronization with the original sequence. In one embodiment, device A "catches up" to the current value by rapidly computing all values that occurred within the time interval until reaching the current password; then upon reaching the current value, device A resumes computing the next consecutive value every 60 seconds.

The present disclosure has therefore identified methods for selectively capturing ("peeling") and copying ("cloning") OTP tokens from one device to another while maintaining OTP state. While this invention has been described with reference to illustrative embodiments, the invention is not limited to the described embodiments but may be embodied in other specific forms without departing from its spirit or essential characteristics. For example, the invention may be implemented to peel and clone a token from a single-token device as well as a multiple token-device; and the invention may be used to peel and clone passwords, algorithms, shared secrets or the like associated with authentication modalities other than one-time passwords. The scope of the invention is, therefore, indicated by the appended claims rather than by the foregoing description. All changes that come within the meaning and range of equivalency of the claims are to be embraced within their scope.

The present invention can be embodied in the form of methods and apparatuses for practicing those methods. The present invention can also be embodied in the form of program code embodied in tangible media, such as floppy diskettes, CD-ROMs, hard drives or any other machine-readable storage medium, wherein, when the program code is loaded into and executed by a machine, such as a computer or processor, the machine becomes an apparatus for practicing the invention. The present invention can also be embodied in the form of program code, for example, whether stored in a storage medium, loaded into and/or executed by a machine or transmitted over some transmission medium or carrier, such as over electrical wiring or cabling, through fiber optics, or via electromagnetic radiation, wherein, when the program is loaded into and executed by a machine, such as a computer, the machine becomes an apparatus for practicing the invention.

It should also be understood that the steps of the exemplary methods set forth herein are not necessarily required to be performed in the order described, additional steps may be included in such methods, and certain steps may be omitted or combined in methods consistent with various embodiments of the present invention.

What is claimed is:

1. A method, carried out by a first communication device that maintains one or more one-time password (OTP) tokens for authenticating access to a corresponding one or more accounts of a user, for selectively capturing and cloning selected tokens from the first communication device to a second communication device, the method comprising:
   selecting, responsive to user input, one or more of the OTP tokens resident on the first communication device and in time-synchronization with a corresponding authentication entity, yielding one or more selected tokens to be cloned;
   for each selected token, sending state information to the second communication device that will enable the second communication device to generate OTP sequences corresponding to the selected token in time-synchronization with said corresponding authentication entity and said first communication device, wherein some time after sending said state information to the second communication device that enables the second device to generate OTP sequences corresponding to the selected token, the first communication device experiences a loss of synchronization of the one or more selected tokens;
   after said loss of synchronization, sending a message to the second communication device to request restoration of the OTP sequences corresponding to the one or more selected tokens;
   responsive to the request, receiving said state information corresponding to the one or more selected tokens; and
   using said state information to restore the OTP sequences corresponding to the one or more selected tokens in proper time-synchronization with a corresponding authentication entity.

2. The method of claim 1, wherein the first communication device maintains multiple OTP tokens, and wherein the step of selecting comprises selecting a subset of the multiple OTP tokens to be cloned.

3. The method of claim 1, wherein the step of sending state information comprises sending, for each selected token:
   a key corresponding to the selected token;
   a current value of the OTP sequence corresponding to the selected token; and
   a time to expiry value of the current value.

4. The method of claim 1, wherein the step of receiving state information comprises receiving, from the second communication device:
   a key corresponding to the selected token;
   a current value of the OTP sequence corresponding to the selected token; and
   a time to expiry value of the current value.

5. A method, carried out by a second communication device in a communication system that includes a first and second communication device and wherein the first communication device maintains one or more one-time password (OTP) tokens for authenticating access to a corresponding multiple accounts of a user, the method comprising:
   receiving, from the first communication device, a request to clone at least one selected token of the one or more OTP tokens maintained by the first communication device in time-synchronization with at least one authentication entity;
   coincident to the request, receiving state information associated with the at least one selected token;
   using the state information to generate OTP sequences corresponding to the at least one selected token in time-synchronization with said first communication device and said corresponding at least one authentication entity, wherein some time after sending said state information to the second communication device that enables the second device to generate OTP sequences corresponding to the at least one selected token, the first communication device experiences a loss of synchronization of the at least one selected token:,
   receiving a message from the first communication device to request restoration of the OTP sequences corresponding to the at least one selected token;
   responsive to the request, sending said state information associated with the at least one selected token to the first communication device that will enable the first communication device to regenerate OTP sequences corresponding to the at least one selected token in time-synchronization with at least one corresponding authentication authority.

6. The method of claim 5, wherein the step of receiving state information comprises receiving:
   a key corresponding to each of the at least one selected tokens;
   a current value of the OTP sequence corresponding to each of the at least one selected tokens; and
   a time to expiry value of the current value corresponding to each of the at least one selected tokens.

7. The method of claim 5, wherein the step of sending state information comprises sending:
   a key corresponding to each of the at least one selected tokens;
   a current value of the OTP sequence corresponding to each of the at least one selected tokens; and
   a time to expiry value of the current value corresponding to each of the at least one selected tokens.

8. A method comprising:
   maintaining one or more one-time password (OTP) tokens resident on a first device for authenticating access to a corresponding one or more accounts of a user, the one or more OTP tokens being time-synchronized with a corresponding authentication entity and subject to loss of said time-synchronization;
   sending state information that will enable a second device to generate OTP sequences corresponding to at least one selected token of the one or more OTP tokens from the first device to the second device; and
   following said loss of time-synchronization of the at least one selected token resident on the first device, sending a message to the second device to request restoration of the OTP sequences corresponding to the at least one selected token and, responsive to the request, obtaining said state information from the second device that will enable the first device to regenerate OTP sequences corresponding to the at least one selected token in proper time-synchronization with the corresponding authentication entity and said second device.

9. A communication system comprising:
   a first communication device configured to maintain one or more one-time password (OTP) tokens for authenticating access to a corresponding one or more accounts of a user; and
   a second communication device configured to receive state information associated with at least one selected token of the one or more tokens and to generate OTP sequences corresponding to the at least one selected token in time-synchronization with said first communication device and a corresponding at least one authentication entity, wherein some time after sending said state information to the second communication device that enables the second device to generate OTP sequences corresponding to the at least one selected token, the first communication device experiences a loss of synchronization of the at least one selected token, wherein the first communication device sends a message to the second communication device to request restoration of the OTP sequences corresponding to the at least one selected token and, responsive to the request, obtains said state information from the second communication device to enable the first device to regenerate OTP sequences corresponding to the at least one selected token in proper time-synchronization with the at least one corresponding authentication entity and the second communication device.

* * * * *